(No Model.)
F. BÖRNER.
VINE AND FLOWER STAKE.
No. 291,569. Patented Jan. 8, 1884.
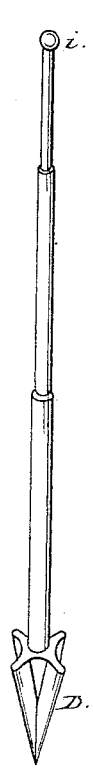
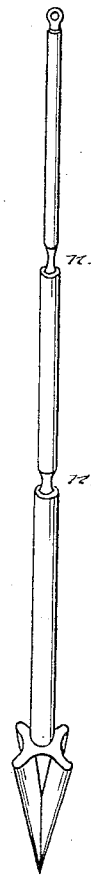

UNITED STATES PATENT OFFICE.

FRANZ BÖRNER, OF COLOGNE, GERMANY.

VINE AND FLOWER STAKE.

SPECIFICATION forming part of Letters Patent No. 291,569, dated January 8, 1884.

Application filed August 24, 1882. (No model.) Patented in France October 20, 1879, No. 133,251; in Italy April 30, 1880, No. 11,823; in Spain April 30, 1880, No. 814; in Austria-Hungary July 23, 1880, No. 13,859, and No. 2,031; in Germany October 27, 1880, No. 14,208, and in Belgium November 4, 1881, No. 56,130.

*To all whom it may concern:*

Be it known that I, FRANZ BÖRNER, a citizen of Germany, and a resident of the city of Cologne, in the Empire of Germany, have invented a new and useful Improvement in Vine and Flower Stakes, of which the following is a specification.

This invention relates to metallic posts or stakes for gardening; and it consists in the peculiar construction thereof, and the combination of the parts forming the same, as hereinafter set forth.

In the accompanying drawings various iron stakes are represented, referred to in the following specification.

Figures 1 and 2 represent a hollow stake, $d$, with a pyramidical point, $a$, whose surfaces $b$ are hollowed out. A tube, $f$, is inserted into this stake $d$, which tube receives again a smaller rod, $g$, by which arrangement the stake can easily be made of any height. Instead of the straight rod $g$, a rod bent and extending from one stake to the next stake may be inserted to connect and strengthen the same. The shoulders formed at the connecting-points of rod $g$ with tube $f$ and of tube $f$ with stake $d$ form convenient places for the fastening of the vine or flowers.

Figs. 3 and 4 represent a stake constructed similar to Fig. 2, with an eye, $i$, at its upper end for fastening the vine, and provided with a cross-shaped point, D, at its lower end for insertion and fastening into the ground.

Fig. 5 shows a stake provided with a number of recesses, $n$ $n$, for facilitating the attachment of the vine.

Fig. 6 shows a stake, J, made of flat iron of different widths, thereby forming shoulders for the attachment of the vine or flowers.

What I claim as my invention, and desire to secure by Letters Patent, is—

As an article of manufacture, a gardener's stake consisting of an upwardly-diminishing series of sections, the lower section being provided with a spear-head point and the upper end of each section, except the top one, forming a shoulder for the attachment of vines and other plants, substantially as set forth.

FRANZ BÖRNER.

Witnesses:
ADOLPH MÜLLER,
JOHANN ROSS.